United States Patent [19]

Smith et al.

[11] Patent Number: 4,773,959
[45] Date of Patent: Sep. 27, 1988

[54] APPARATUS FOR THE MANUFACTURE OF PRINTED AND EMBOSSED FLOOR COVERING

[75] Inventors: Merrill M. Smith, Morrisville, Pa.; Donald C. Ferguson, Trenton, N.J.

[73] Assignee: American Biltrite, Inc.

[21] Appl. No.: 908,068

[22] Filed: Sep. 16, 1986

Related U.S. Application Data

[60] Division of Ser. No. 805,587, Dec. 9, 1985, Pat. No. 4,612,074, which is a continuation of Ser. No. 525,892, Aug. 24, 1983, abandoned.

[51] Int. Cl.⁴ ............... B32B 31/00; G05G 15/00; B44B 5/00; B44C 1/00
[52] U.S. Cl. ................................ 156/351; 156/220; 156/240; 156/361; 156/378; 156/540; 425/515
[58] Field of Search ............. 156/361, 540, 230, 240, 156/220, 277, 209, 222, 231, 269, 85, 351, 78, 553, 246, 353, 269, 555, 284, 352; 264/118, 119, 40.2, 284; 425/159, 155, 161, 163, 515

[56] References Cited

U.S. PATENT DOCUMENTS

| 2,559,649 | 7/1951 | Little et al. | 156/230 |
|---|---|---|---|
| 2,961,332 | 11/1960 | Nairn | 156/78 |
| 3,293,108 | 12/1966 | Nairn | 156/78 |
| 3,339,521 | 9/1966 | Spencer | 156/553 |
| 3,465,384 | 9/1969 | Barchi et al. | 425/214 |
| 3,655,312 | 4/1972 | Erb et al. | 156/220 |
| 3,694,634 | 9/1972 | Horst et al. | 101/181 |
| 3,741,851 | 6/1973 | Erb et al. | 156/220 |
| 3,801,406 | 4/1974 | De Benedetti | 156/269 |
| 3,860,440 | 1/1975 | Nakajo | 156/231 |
| 3,915,785 | 10/1975 | Müller | 156/351 |
| 3,923,583 | 12/1975 | Biauchini | 156/378 |
| 4,070,435 | 1/1978 | Lewicki, Jr. et al | 156/220 |
| 4,089,731 | 5/1978 | Lewicki, Jr. | 156/555 |
| 4,142,849 | 3/1979 | Lewicki, Jr. | 156/220 |
| 4,158,070 | 6/1979 | Lewicki, Jr. et al. | 264/284 |
| 4,187,131 | 2/1980 | Shortway et al. | 156/220 |
| 4,198,456 | 4/1980 | Adams et al. | 428/159 |
| 4,225,374 | 9/1980 | Kaufmann | 156/240 |
| 4,236,955 | 12/1980 | Prittie | 156/352 |
| 4,312,686 | 1/1982 | Smith et al. | 156/220 |
| 4,460,429 | 7/1984 | Coscia et al. | 156/246 |
| 4,572,752 | 2/1986 | Jensen et al. | 156/361 |

FOREIGN PATENT DOCUMENTS

| 152464 | 6/1976 | Japan . | |
| 210814 | 12/1982 | Japan | 156/269 |

Primary Examiner—Michael Ball
Assistant Examiner—Louis Falasco
Attorney, Agent, or Firm—Pennie & Edmonds

[57] ABSTRACT

An improved means is disclosed for continuously forming tiles that are embossed in register with a printed design. A printed design is first applied to a base coat and a wear coat is laminated over the design. Advantageously, the wear coat is applied to the printed web before it is heated for lamination. Before embossing occurs, the laminated product is cooled until partial setting occurs, and the embossing roll is sprayed with water in order to minimize the likelihood that the laminated product will adhere to the embossing roll. To avoid distorting the web during lamination and embossing, proper web tension is maintained by controlling the rotational speeds of the laminating drum and the embossing roll so that a desired ratio is preserved. The web is then cut into oversized tiles that shrink to size during annealing.

11 Claims, 3 Drawing Sheets

APPARATUS FOR THE MANUFACTURE OF PRINTED AND EMBOSSED FLOOR COVERING

This is a division of application Ser. No. 805,587 filed Dec. 9, 1985 now U.S. Pat. No. 4,612,074, which is a continuation of application Ser. No. 525,892 filed Aug. 24, 1983.

BACKGROUND OF THE INVENTION

This invention concerns a printed and embossed material, suitable for use as a floor covering, and a method and apparatus for making it in a continuous process. More particularly, it concerns a multilayered material combining a base layer, a printed layer and a wear resistant layer, which is embossed in register with the print.

Reverse printed laminates have been made by laminating separate sheets of calendered base material and a preprinted plastic film. In continuous processes, the printed designs have been limited to random prints because of the difficulty of maintaining the desired dimensions in the preprinted plastic film, in the laminate and in some cases in the base material. The plastic film tends to stretch when it is being printed and subsequently dried. Since it is necessary to apply tension to the printed film during lamination in order to eliminate trapped air and wrinkles, the printed design can also be distorted during lamination.

Alternatively, tiles can be formed in batch processes with designs that are in register to the cut tile by laminating preprinted plastic sheets of silk screen designs to sheets of a suitable base material. The tiles can then be hand clicked from the sheets. The high cost of such a batch process makes in-register printed tile quite expensive and limits its acceptance.

An additional complication is imposed by the desirability of providing a textured surface by embossing the tile. Because the embossing step can be another cause of distortion, some processes are limited to embossing of a plastic surface layer that is integral with a nonplastic stable substrate such as asbestos or asphalt-saturated felt.

Alternatively, as described in U.S. Pat. No. 4,312,686, which is incorporated herein by reference, the distortions which occur during printing and laminating are minimized by printing the design on a stable base, preferably release paper, and then transferring the printed design to a hot plastic web made continuously by an extruder. A stress relieved hot plastic film is then laminated to the printed web to provide a protective wear coat. To emboss in register with the printed design, the laminated product is first aligned by means of registration marks that are printed along with the design. Embossing is then made using a conventional engraved roll having raised sections which are images of the printed design. After embossing, the web is partially cooled and annealed. It is then aligned with a die cutter using the same registration marks as used for alignment during embossing. As a result, individual tiles are cut automatically in register to the printed and embossed pattern. Although the method described in the '686 patent is operative, a process line using this method has been limited to web speeds on the order of 90 feet per minute with a yield of about 50% firsts and 15% seconds with the remaining 35% scrap.

SUMMARY OF THE INVENTION

We have devised an improved process suitable for continuously producing tiles in which an embossed design is in register with the tile. The improved process generally follows the steps disclosed in the '686 patent. In accordance with this process, the design is printed on a stable base, preferably release paper, and the printed design is then transferred to a plastic web that is made continuously. A wear coat is then laminated onto the printed web and this laminate is embossed using a conventional engraved roll having raised sections which are images of the printed design.

As in the '686 patent, distortions are minimized by supporting the plastic web on a belt which is not an integral part of the finished product and alignment is performed by maneuvering the belt. Moreover, in accordance with the invention, proper tension of the web is maintained to avoid distorting the web during lamination and embossing. By ensuring proper tension, the laminated product does not become distorted either by bunching up which causes lateral expansion in the direction transverse to the direction of travel of the web or by stretching in the direction which is the same as the direction of travel of the web. Proper tension is preserved by continuously monitoring the rotational speed of the rotating drum, the embossing roll and backup roll to maintain them at a desired speed ratio.

After embossing, the web is cooled in a water bath, is partially annealed and is cooled. It is then aligned with a die cutter using the same registration marks as used for alignment during embossing. As a result, individual tiles can be cut automatically in register to the printed and embossed pattern. Advantageously, the tiles are cut slightly oversize and are further annealed to shrink them to their proper size.

Preferably, the wear coat is laminated onto the printed web by using a heated rotating drum to apply a plastic film to the printed web and then heating the film and web. To prevent the laminated web from adhering to the embossing roll, the roll and the laminated web are cooled with sprays of water which cause the laminated web to set partially at the embossing stage.

When using this method in a process line, we have found it possible to run the web at speeds of up to 160 feet per minute and expect to achieve speeds of about 180 feet per minute. Moreover, we have been able to produce yields of about 88% firsts and 3% seconds.

BRIEF DESCRIPTION OF THE DRAWINGS

These and other objects, features and advantages of our invention will be more readily apparent from the following detailed description of a preferred embodiment of the invention in which.

DESCRIPTION OF THE PREFERRED EMBODIMENTS

Figure 1:
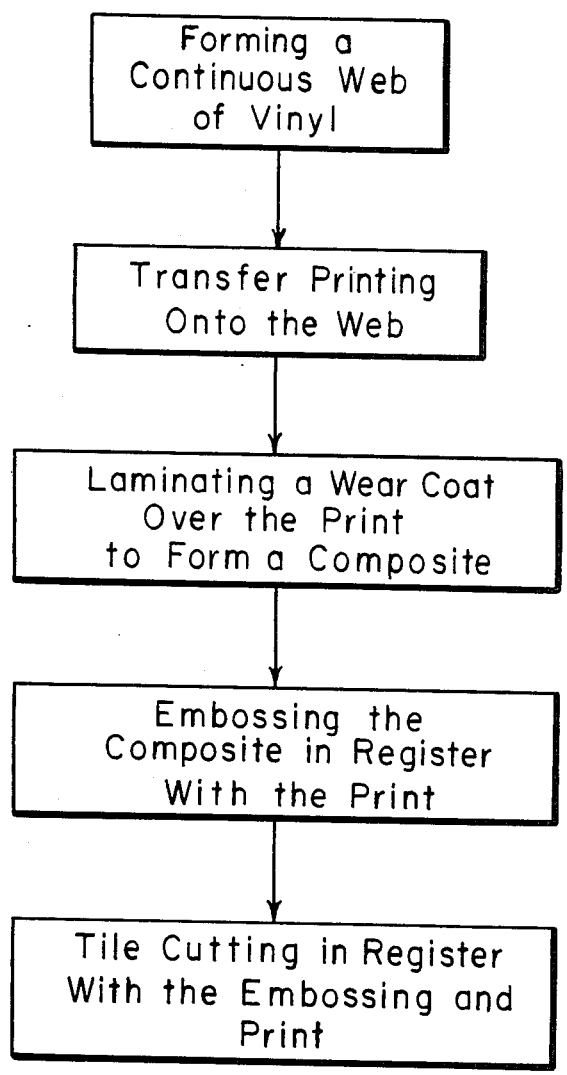
FIG. 1 is a block diagram illustrating the major steps followed in the practice of our invention.
Figure 2:
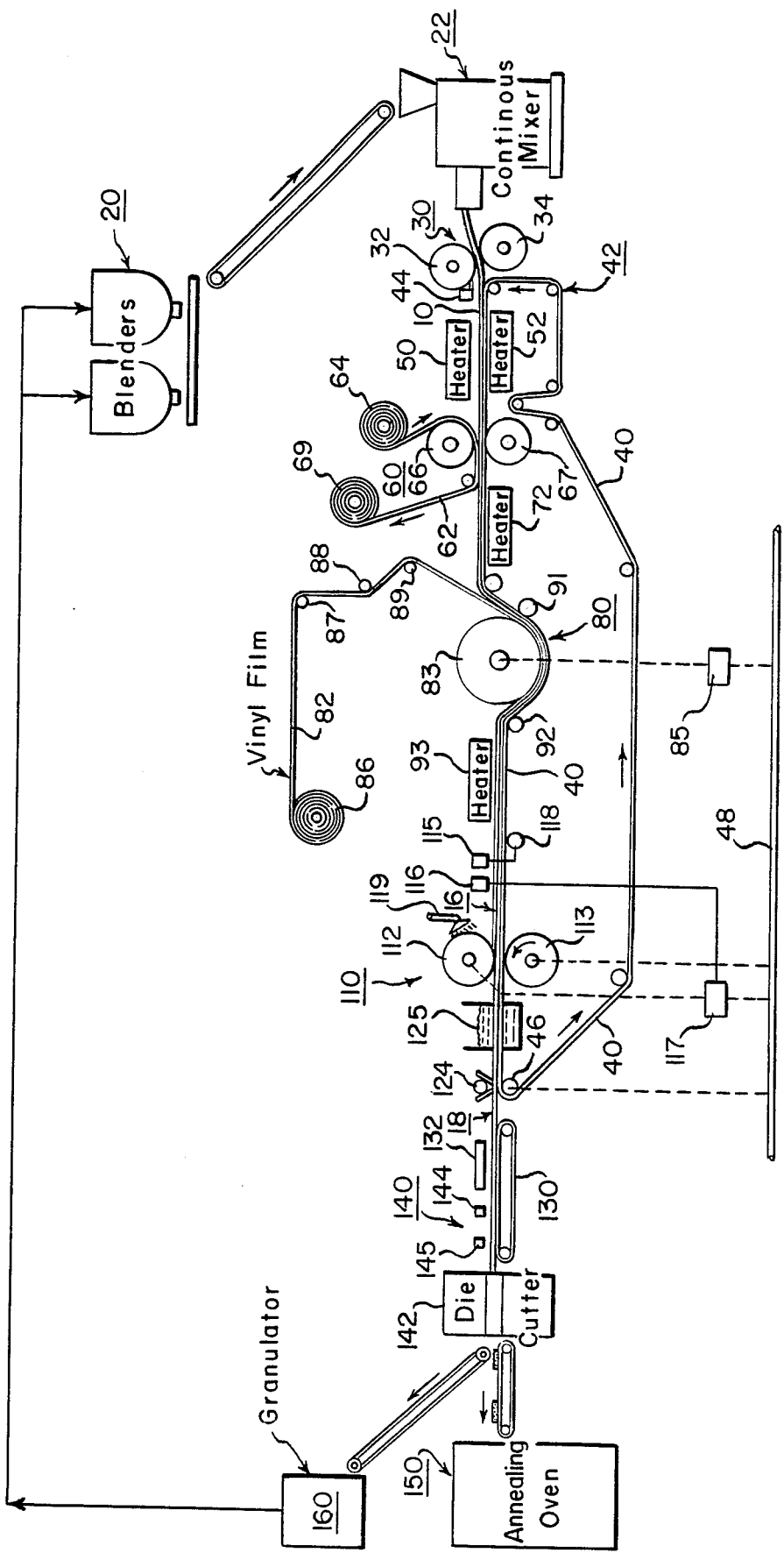
FIG. 2 is a schematic diagram of a preferred embodiment of apparatus used in the practice of our invention.
Figure 7:
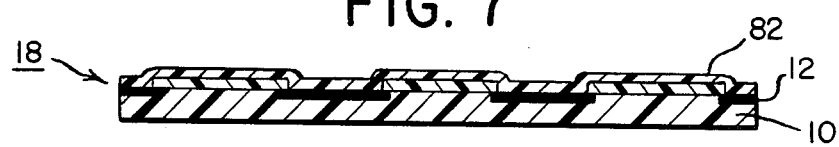
FIG. 7 is a cross-section of the base web, print layer and vinyl film after it has been embossed in register with the print by the embossing roll of FIG. 6.
Figure 8:
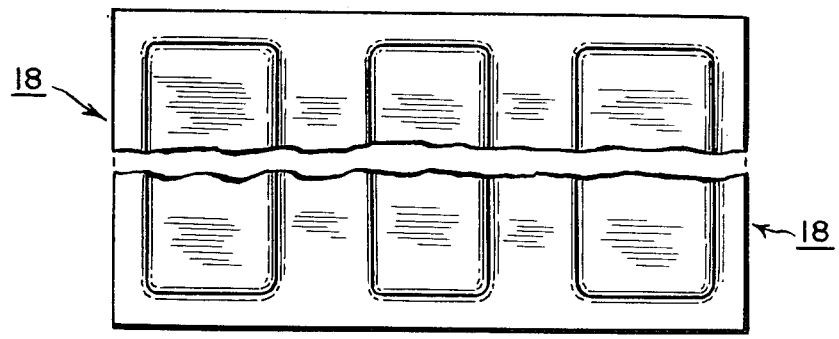
FIG. 8 is a plan view of a tile which has been embossed in register with the print using the embossing roll of FIG. 6.

FIGS. 1 and 2 illustrate a preferred method and apparatus for practicing our invention to make a solid vinyl tile on which a decorative layer of print has been embossed in register with the print. Substantial portions of this method and apparatus are similar to those described in the '686 patent. Cross-sectional and plan views of the finished tile are shown in FIGS. 7 and 8.

As shown in FIG. 1, the major steps followed in making such a tile comprise: forming a continuous web of vinyl, transfer printing on this web, laminating a protective wear coat over the print to form a composite, embossing the composite in register with the print, and tile cutting in register with the print. In accordance with the invention, the composite is embossed in register with the print while maintaining proper tension in the web as it is fed into the embossing roll. Preferably, the embossed laminate is partially annealed before cutting; and further annealing is performed on the tiles after they are cut. Infrared heating is used to raise the web and the wear coat to appropriate temperatures for transfer printing, laminating, and pre-annealing. Final annealing is accomplished in a hot air oven.

Figure 3:
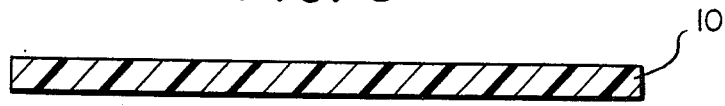
FIG. 3 is a cross-section of a base web used in the practice of our invention.

Specific apparatus for performing the steps of FIG. 1 is shown in FIG. 2. A continuous base web of vinyl is prepared by blending its constituents in blenders 20 and supplying the mix to a continuous mixer 22. Hot plastic from mixer 22 is continuously supplied to a calender 30 comprising a pair of rolls 32, 34 which produces a continuous hot plastic base web 10 having a surface smooth enough to receive a layer of print. As is known in the art, a doctor knife (not shown) may be used to separate base web 10 from the calender rolls. A cross-section of a portion of base web 10 as it leaves the calender rolls is depicted in FIG. 3. The thickness of this cross-section typically ranges from about 30 to 120 mils (0.75 to 3 mm.). The width of this cross-section is about 14 inches (35 cm.) Other dimensions, however, may be used in the practice of our invention.

As described in the '686 patent, hot plastic web 10 flows continuously onto a moving carrier belt 40 which is made of a material such that the web will adhere to the belt when the web is hot, but can be removed from it when the web is cool. Typically, such a carrier belt is made of woven fiberglass impregnated with a silicone elastomer. Carrier belt 40 moves base web 10 through the printing, laminating and embossing stages, supporting the web during these steps. The belt is driven at this speed by a drive roll 46 that is driven by means of a conventional line shaft 48. To avoid distorting the plastic web and the design printed thereon, the web is guided and aligned by adjusting the carrier belt by means of a guidance system 42. Near calender 30, a loop speed sensor 44 is used to control the speed of the carrier belt so that the hot plastic web leaves calender rolls 32, 34 at a constant speed.

As it is moved away from calender 30, web 10 is heated to the temperature required to obtain transfer of print from a pre-printed release paper to the web. A first infrared heater 50 heats web 10 directly; and a second infrared heater 52 heats carrier belt 40 which, in turn, heats web 10. For the transfer printing system used in the practice of the preferred embodiment of our invention, this temperature is about 250° F. (121° C.).

Next, the web enters a transfer printing station 60 that transfers a layer of print from a preprinted release paper 62 to web 10. The print layer can form any kind of design. For high-volume commercial production of tiles the design is preferably one that permits tiles to be cut with the design centered in the tile so that it is in register with the edges of the tile.

The preprinted paper is fed from a supply roll 64, through transfer rolls 66, 67 to a takeup roll 69. In practicing our invention we have found it useful to cool roll 66 to about 70° F. (21° C.) to facilitate transfer printing. To ensure proper alignment of the printed paper in a transverse direction, an edge guidance system (not shown) is used. Moreover, to permit splicing of rolls of preprinted paper it is preferable to use conventional splicing equipment (not shown) including an unwind roll stand, a splice table and a compensator that allows time to splice the printed design in register.

Figure 4:
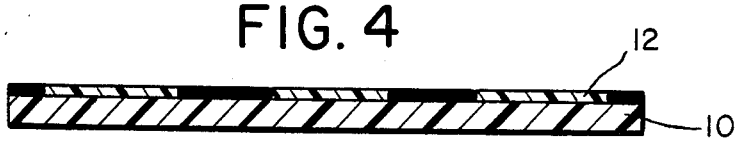
FIG. 4 is a cross-section of a base web after a print layer has been transferred to it in accordance with our invention.

To transfer the layer of print from the release paper, paper 62, web 10 and carrier belt 40 are fed through the nip formed by rolls 66, 67; and the paper is then separated from the web. Advantageously a release plate (not shown) can be used at the point of separation of paper 62 from web 10 and takeup roll 69 can be provided with suitable tension control devices. A cross-section of the printed web depicting base web 10 and a print layer 12 is shown in FIG. 4. This cross-section is not to scale because the thickness of the print layer is quite small (0.0025 to 0.025 mm.) compared to the 0.75 to 3 mm. thickness of base web 10.

The printed web is then heated indirectly by an infrared heater 72 that heats the underside of carrier belt 40. The web is next fed into a laminating station 80 where a web 82 of vinyl film is laminated to the printed side of web 10 to provide a protective wear coat. Laminating station 80 comprises a heated rotating drum 83, an upper high intensity infrared heater 93, a web guide 89, a supply roll 86, and rollers 87, 88, 91 and 92. In addition, the station preferably includes conventional splicing equipment (not shown) including an unwind roll stand, a hot splicer and a compensating device which allows time to splice the film.

Drum 83 is driven by line shaft 48 which is coupled to the drum by means of a speed control 85 such as a Specon (Rez. T.M.) speed control manufactured by Fairchild Hiller. As described below, the speed control 85 regulates the speed of the drum relative to that of the embossing roll and backup roll.

Supply roll 86 provides a continuous web of preformed vinyl film. Typically, the vinyl film is from 3 to 12 mils (0.075 to 0.3 mm) in thickness.

Figure 5:
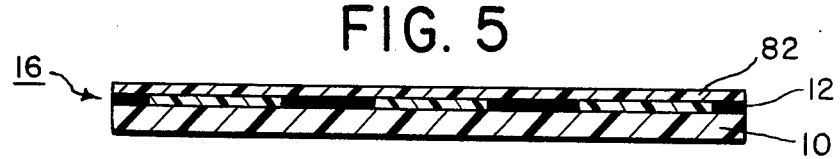
FIG. 5 is a cross-section of the base web after a vinyl film has been laminated over the print layer.

. Web 82 passes through web guide 89 which moves web 82 in a transverse direction so that web 82 is in register with the printed web. Illustratively, web guide 89 is a Fife edge guide. Web 82, the printed web and carrier belt 40 pass through the nip formed by rotating drum 83 and roller 91; and web 82 is pressed and laminated by drum 83 onto the printed web. These webs adhere to carrier belt 40 and strip away from rotating drum 83 at roller 92 and pass on carrier belt 40 under heater 93. Infrared heater 93 heats the vinyl film and, therefore, the printed web. For the films used in the practice of the preferred embodiment of the invention, the temperature of web 82 is raised to approximately 310° F. (154° C.) by infrared heater 93 with the result that the vinyl film is stress relieved and forms a composite 16 in which print layer 12 is located between webs 82 and 10. A cross-section of composite 16 showing vinyl wear coat 82 over print layer 12 is shown in FIG. 5.

Figure 6:
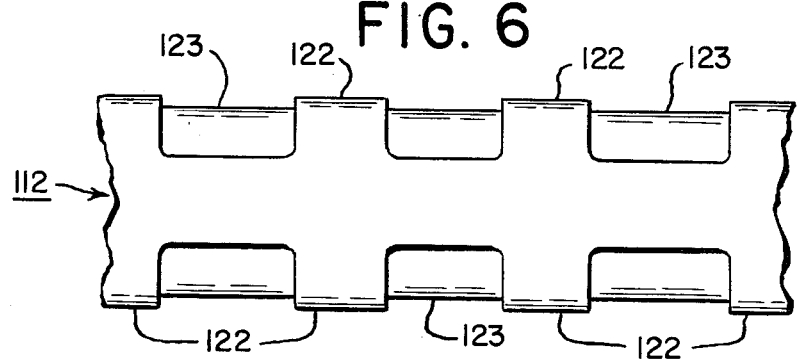
FIG. 6 is a view of an embossing roll used in the practice of our invention.

The carrier belt then moves the composite to an embossing station 110. This station comprises an embossing roll 112, a rubber backup roll 113, and means for transverse and longitudinal positioning of the laminated web. As shown in FIG. 6, embossing roll 112 is an engraved or etched steel or copper roll having areas 122 that are raised above other areas 123 on the roll. Typically the difference in height between areas 122 and 123 averages about 6 to 14 mils (0.15 to 0.35 mm.). Preferably, areas 122 constitute an image of the design that is transfer printed onto the base web. Both the embossing roll and the backup roll are water cooled.

The positioning means includes two electric eyes 115, 116, a speed control means 117 and a positioning roll 118. Backup roll 113 is driven directly by line shaft 48 so that its surface speed is the same as that of drive rolls 46. Embossing roll 112 is also driven by line shaft 48 but its speed is controlled by speed control means 117. The electric eyes sense registration marks which are printed on the web along with the printed design. Electric eye 115 controls positioning roll 118 which guides composite 16 in the transverse direction so that the embossing roll areas 122 are in register with the images on the printed web. Electric eye 116 is connected to speed control 117 and controls the phase of the embossing roll so that embossing roll areas 122 are in register in the longitudinal direction with the printed pattern on the web. Specific apparatus for producing transverse and longitudinal registration with the embossing roll include a Fife photoelectric line control and a Bobst Champlain registron control, respectively. Numerous other devices will be apparent to those skilled in the art.

The outer surface of embossing roll 112 is cooled directly by a water spray 119, and this spray also cools the upper surface of composite 16. Water spray 119 cools and sets composite 16 to such a degree that stretching of composite 16 by rolls 112 and 113 is minimized. Applying water to roll 112 before composite 16 makes contact reduces the likelihood that composite 16 will adhere to roll 112. Composite 16 and belt 40 pass through the nip defined by embossing roll 112 and backup roll 113; and raised areas 122 of the embossing roll form corresponding depressions in the composite. A cross section of an embossed composite 18 as formed by this step is shown in FIG. 7 and a plan view in FIG. 8.

In accordance with our invention, we have found it advantageous to control the surface speed of rotating drum 83 relative to that of embossing roll 112 and backup roll 113 so that the surface speed of drum 83 is about 98 to 99% of that of rolls 112 and 113 and preferably is about 98.2%. Advantageously, this speed relation can be maintained by setting speed control 85 so that its output rotational shaft speed is in the range of 98 to 99% of its input rotational shaft speed which is the same rotational speed as that of line shaft 48. With this speed relationship, we have found that appropriate tension is produced in composite 16 so that the composite does not become distorted either by bunching up which causes lateral expansion in the direction transverse to the direction of travel of the web or by stretching in the direction which is the same as the direction of travel of the web. As a result, production line throughput is greatly increased and product quality is also improved.

After passing through the nip formed by rolls 112 and 113, embossed composite 18 is cooled to a low enough temperature that the embossed composite 18 can be stripped from silicone carrier belt 40. Preferably, this cooling operation is accomplished by immersing composite 18 and belt 40 in a water bath 122. This step permits accurate temperature control during all seasons. In practicing the preferred embodiment of our invention we have found it satisfactory to cool composite 18 to about 80° to 90° F. (27° to 32° C.). Excess water is then removed from the web by a high velocity air knife 124; and the embossed web is stripped from carrier belt 40.

At this point the carrier belt 40 reverses direction. The embossed web, however, moves onto a conveyor belt 130 which carries it through a pre-annealing station 132 which partially removes the strains imparted by laminating and embossing. After pre-annealing, the embossed web is cooled to about 100° to 110° F. (38° to 43° C.). It then enters a tile cutting station 140 where it is aligned and cut into tiles in register with the pattern printed on the web. Tile cutting station 140 comprises a tile cutter 142, electric eyes 144, 145, and equipment responsive to signals from the electric eyes for aligning the web in the transverse and longitudinal directions.

Specific apparatus for aligning embossed composite 18 will be apparent to those skilled in the art from the teaching of Barchi et al.'s U.S. Pat. No. 3,465,384, entitled "Apparatus for Registration of Plastic Web", which is incorporated herein by reference. As disclosed in that patent, a plastic web 6 is fed on a conveyor belt 28 into a tile cutter 36. Photocells 32, 34 are used to maintain the desired transverse position of the plastic web by driving a reversible motor 128 that controls the lateral position of conveyor 28. The photocells sense the lateral position of the plastic web by sensing a continuous longitudinal stripe 92 that is embossed in the plastic web at the same time as a design is embossed in the remainder of the web. In like fashion in the present invention, electric eyes 144, 145 sense registration marks that are printed on the web along with the printed design. Advantageously these registration marks can be the same as those used to align the web at the embossing station. Numerous closed loop feedback systems for control of both lateral and longitudinal position of the web will be apparent.

The tiles are cut so that they are slightly oversize. They are then annealed in an annealing oven 150 at an oven temperature of about 350° F. (177° C.) to shrink them to their proper size. Finally they are cooled to ambient temperature and packaged for shipment. Scrap from the tile cutting operation is fed to a granulator 160 and returned to blenders 20 for further use.

Suitable formulations for base web 10, release paper 62 and vinyl film 92 are set forth in the above referenced '686 patent. Preferably the base web is formed of a vinyl composition comprising a minor portion of plasticized vinyl chloride polymer, and/or vinyl acetate copolymer, containing at least 80% vinyl chloride, uniformly mixed with a major proportion of mineral filler, said minor portion constituting about 16 to 25% by weight of the composition and said major portion constituting about 75 to 84% by weight of the composition.

The operating temperatures set forth above are preferred. Operating ranges for the case where the plastic base web and the plastic wear layer are vinyl compositions are as follows. The plastic base web 10 is heated to an average temperature in the range of about 200° F. to 280° F. (93° C. to 138° C.) prior to transfer printing; the release paper 62 is heated to an average temperature in the range of about 60° F. to 120° F. (16° C. to 49° C.) prior to transfer printing; and the vinyl wear layer and the plastic base web are heated to an average temperature in the range of about 270° F. to 310° F. (132° C. to 154° C.) during lamination.

As will be apparent, many of the individual pieces of apparatus used in practicing our invention are conventional. Extrusion equipment, heaters, printing stations, laminating stations, embossing stations, die cutting equipment and aligning apparatus are old. However, the combination of this equipment to produce tile that is embossed in register with print on a continuous basis, at a high output rate and yielding a high percentage of usable tile is new.

While the invention has been described in conjunction with specific embodiments, it is evident that numerous alternatives, modifications, and variations will be apparent to those skilled in the art in light of the forgoing description.

What is claimed is:

1. Apparatus for making, on a continuous basis, a composite vinyl tile comprising
   means for forming a continuous base web on a moving supported surface, said web being formed from a vinyl composition, said moving surface being made of a material such that the base web will adhere to the surface when the web is hot but can be removed from it when the web is cooled,
   means for raising the temperature of said web,
   means for transferring a printed design from a pre-printed stable carrier sheet to the continuous base web, said printed design being formed by a vinyl material compatible with said base web, said printed design including a first portion which constitutes a decorative design for the finished product and a second portion which provides registration indicia for use in the manufacture thereof,
   means for laminating a clear plastic wear layer over the printed design on the base web,
   means for aligning the web, after the base web is laminated, by means of the printed registration indicia so that the web is aligned with an embossing roll in both the direction transverse to the direction of travel of the web and the direction that is the same as the direction of travel of the web,
   means for mechanically embossing the printed side of the base web with depressions in registration with the printed decorative design,
   means for cooling the base web,
   means for stripping the cooled web from the moving surface,
   means for aligning the web by means of the printed registration indicia so that the web is aligned with a cutting tool in both the direction transverse to the direction of travel of the web and the direction that is the same as the direction of travel of the web,
   means for cutting the base web into tiles so that the decorative design is in register with the edges of the tile, and
   means for annealing the cut tiles,
   characterized by means for continuously controlling the speed of the continuously moving base web in the laminating step relative to the speed of the continuously moving base web in the embossing step in order to maintain proper web tension so that the web does not expand laterally in the direction transverse to the direction of travel of the web or stretch in the same direction as the direction of travel of the web.

2. The apparatus of claim 1 further comprising means for cooling the web with water prior to mechanical embossing so that stretching of the web by the embossing roll will not occur.

3. The apparatus of claim 1 further comprising:
   means for pre-annealing the web after it has been stripped from the moving surface, and
   means for cooling the pre-annealed web before it is cut.

4. The apparatus of claim 1 further comprising a rotating drum for applying the wear layer to the base web, the surface speed of said drum being less than that at which the base web is driven through the embossing means.

5. The apparatus of claim 4 wherein the surface speed of the rotating drum is approximately 98 to 99% of that at which the base web is driven.

6. The apparatus of claim 4 wherein the surface speed of the rotating drum is approximately 98.2% of that at which the base web is driven.

7. The apparatus of claim 4 wherein the embossing means comprises a backup roll and an embossing roll and the apparatus further comprises a rotating drum for applying the wear layer to the base web, the surface speed of said drum being less than the surface speed of said backup roll.

8. The apparatus of claim 7 wherein the surface speed of the rotating drum is approximately 98 to 99% of the surface speed of the backup roll.

9. The apparatus of claim 7 wherein the surface speed of the rotating drum is approximately 98.2% of the surface speed of the backup roll.

10. The apparatus of claim 1 wherein the tiles are cut oversized and are shrunken to their proper size during annealing.

11. The apparatus of claim 1 wherein the plastic base web is formed from a vinyl composition comprising a minor portion of plasticized vinyl chloride polymer, and/or vinyl acetate copolymer, containing at least 80% vinyl chloride, uniformly mixed with a major proporion of mineral filler, said minor portion constituting about 16 to 25% by weight of the composition and said major portion constituting about 75 to 84% by weight of the composition.

* * * * *